(12) United States Patent
Flint et al.

(10) Patent No.: US 10,203,057 B2
(45) Date of Patent: Feb. 12, 2019

(54) BELLOWS RESTRAINT

(71) Applicant: Talon Innovations Corporation, Sauk Rapids, MN (US)

(72) Inventors: Aaron Flint, Richmond, MN (US); Dustin Tomhave, Sartell, MN (US)

(73) Assignee: Talon Innovations Corporation, Sauk Rapids, MN (US)

( * ) Notice: Subject to any disclaimer, the term of this patent is extended or adjusted under 35 U.S.C. 154(b) by 352 days.

(21) Appl. No.: 15/082,317

(22) Filed: Mar. 28, 2016

(65) Prior Publication Data

US 2017/0159860 A1    Jun. 8, 2017

Related U.S. Application Data

(60) Provisional application No. 62/263,890, filed on Dec. 7, 2015.

(51) Int. Cl.
| | | |
|---|---|---|
| *F16L 27/11* | (2006.01) | |
| *F16L 27/111* | (2006.01) | |
| *F16L 51/02* | (2006.01) | |
| *F16L 51/03* | (2006.01) | |

(52) U.S. Cl.
CPC .............. *F16L 27/11* (2013.01); *F16L 27/111* (2013.01); *F16L 51/028* (2013.01); *F16L 51/035* (2013.01)

(58) Field of Classification Search
CPC ............................ F16L 27/1085; F16L 27/111
USPC ................................................ 285/114, 226
See application file for complete search history.

(56) References Cited

U.S. PATENT DOCUMENTS

| | | | | |
|---|---|---|---|---|
| 3,295,548 A | * | 1/1967 | Woods ..................... | F16L 27/12 285/114 |
| 3,985,378 A | * | 10/1976 | Muller ................ | F16L 27/1085 285/114 |
| 4,192,143 A | | 3/1980 | Haegele | |
| 4,746,148 A | * | 5/1988 | Perkins .................. | F16L 27/111 285/226 |
| 5,248,170 A | * | 9/1993 | Francis .................. | F16L 51/035 285/227 |
| 5,299,840 A | * | 4/1994 | Heye ..................... | F16L 51/035 285/227 |

(Continued)

FOREIGN PATENT DOCUMENTS

| | | |
|---|---|---|
| EP | 0096198 B1 | 9/1987 |
| KR | 101047341 B1 | 7/2011 |
| KR | 101335923 B1 | 12/2013 |

OTHER PUBLICATIONS

International Search Report and Written Opinion for Application Serial No. PCT/US2016/059682, dated Jan. 3, 2017, 14 pages.

(Continued)

*Primary Examiner* — David Bochna
(74) *Attorney, Agent, or Firm* — Kinney & Lange, P.A.

(57) ABSTRACT

A bellows restraint includes a first bracket having a first mount and a first arm extending from the first mount, a second bracket having a second mount and a second arm extending from the second mount to be adjacent to the first arm with the second arm having at least one through-hole, and a first fastener extending through the at least one through-hole of the second arm to connect to the first arm with the first fastener having a cross-sectional area that is smaller than a cross-sectional area of the at least one through-hole to allow the first bracket to move in relation to the second bracket.

18 Claims, 9 Drawing Sheets

(56) References Cited

U.S. PATENT DOCUMENTS

| | | | |
|---|---|---|---|
| 7,775,561 B2* | 8/2010 | Swank | F16L 21/065 |
| | | | 285/236 |
| 2013/0037764 A1* | 2/2013 | Grivetti | F16L 27/11 |
| | | | 254/100 |
| 2014/0041212 A1 | 2/2014 | Penumatcha et al. | |
| 2015/0084328 A1* | 3/2015 | Kampfe | F16L 27/11 |
| | | | 285/226 |
| 2016/0069491 A1* | 3/2016 | Holbach | F16L 27/1085 |
| | | | 285/223 |

OTHER PUBLICATIONS

ORK Osaka Rasenkan Kogyo Co., Ltd., ORK Expansion Joins, 19 pages.

\* cited by examiner

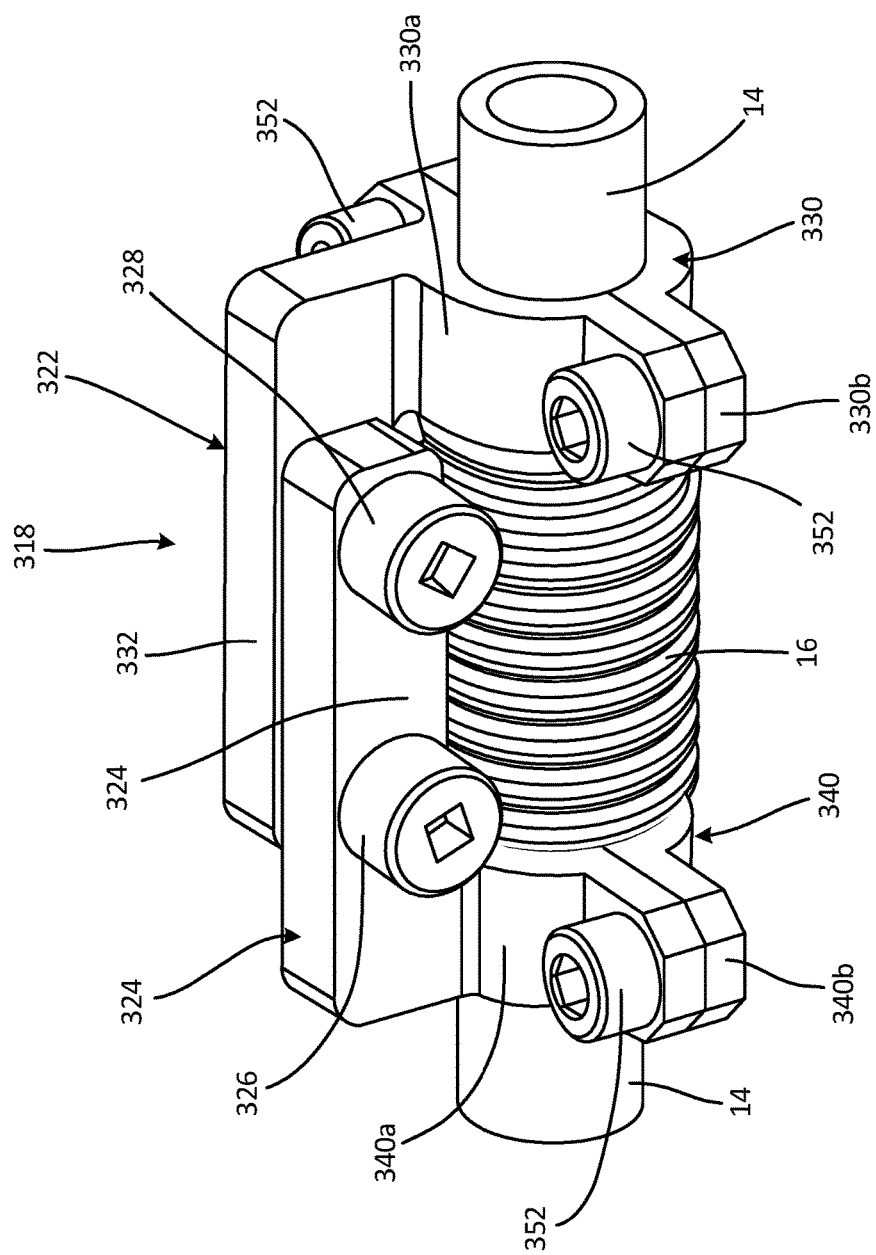

us 10,203,057 B2

BELLOWS RESTRAINT

CROSS-REFERENCE TO RELATED APPLICATION

This application claims priority to U.S. Provisional Application Ser. No. 62/263,890 entitled "Hydraulic System Bellows Restraints" filed on Dec. 7, 2015, the disclosure of which is incorporated by reference in its entirety.

BACKGROUND

The present disclosure relates to bellows used in hydraulic systems, and more particularly to bellows restraints used with bellows that are along hydraulic fluid lines.

A bellows, also known as an expansion joint, along a hydraulic line is useful in allowing the hydraulic line to extend, compress, and deflect without the rigid hydraulic line becoming damaged. To prevent damage due to over-extension, over-compression, and over-deflection, a bellows restraint may be installed surrounding the bellows. Bellows restraints usually include a cylindrical tube that surrounds the bellows and rods that run parallel to the bellows on each side to prevent the bellows from excessive movement. These bellows restraints can take up a great deal of space and may not be able to be installed onto existing bellows, but rather may need to be designed and incorporated into a newly constructed bellows. Further, these bellows restraints are not easily adjustable once the bellows restraint is in place surrounding the bellows.

SUMMARY

A bellows restraint can include a first bracket having a first mount and a first arm extending from the first mount, a second bracket having a second mount and a second arm extending from the second mount to be adjacent to the first arm with the second arm having at least one through-hole, and a first fastener extending through the at least one through-hole of the second arm to connect to the first arm. The first fastener can have a cross-sectional area that is smaller than a cross-sectional area of the at least one through-hole to allow the first bracket to move in relation to the second bracket.

An expansion joint with restraint can include a tube with a hollow inner flow path configured to allow a fluid to flow through the tube, the expansion joint along the tube, a male bracket having a male mount attached to the tube and a male arm extending adjacent to the expansion joint, a female bracket having a female mount attached to the tube and a female arm extending adjacent to the expansion joint and the male arm with the female arm also having at least one through-hole, and a first standoff extending through the at least one through-hole of the female arm and fastened to the male arm configured to limit extension, compression, and an angular deflection of the expansion joint.

A connection along a hydraulic fluid flow path can include a fluid line; a bellows along the fluid line configured to allow compression, extension, and angular deflection of the fluid line; and a bellows restraint adjacent to the bellows configured to limit an amount of compression, extension, and angular deflection of the fluid line. The bellows restraint can include a first support having a first bellows attachment to connect the first support to a first end of the bellows and a first extension extending along the fluid line adjacent to the bellows; a second support having a second bellows attachment, a second extension, a first aperture, and a second aperture with the second bellows attachment connecting the second support to a second side of the bellows and the second extension extending along the fluid line adjacent to the bellows and adjacent to the first extension; a first standoff having a first shaft and a first head with the first shaft extending through the first aperture in the second extension and connected to the first extension and with the first shaft having a cross-sectional area that is less than a cross-sectional area of the first aperture; and a second standoff having a second shaft and a second head with the second shaft extending through the second aperture in the second extension and connected to the first extension and with the first shaft having a cross-sectional area that is less than a cross-sectional area of the second aperture.

BRIEF DESCRIPTION OF THE DRAWINGS

FIG. 9 is a perspective view of a fourth embodiment of a bellows restraint in a free state.

Figure 1:
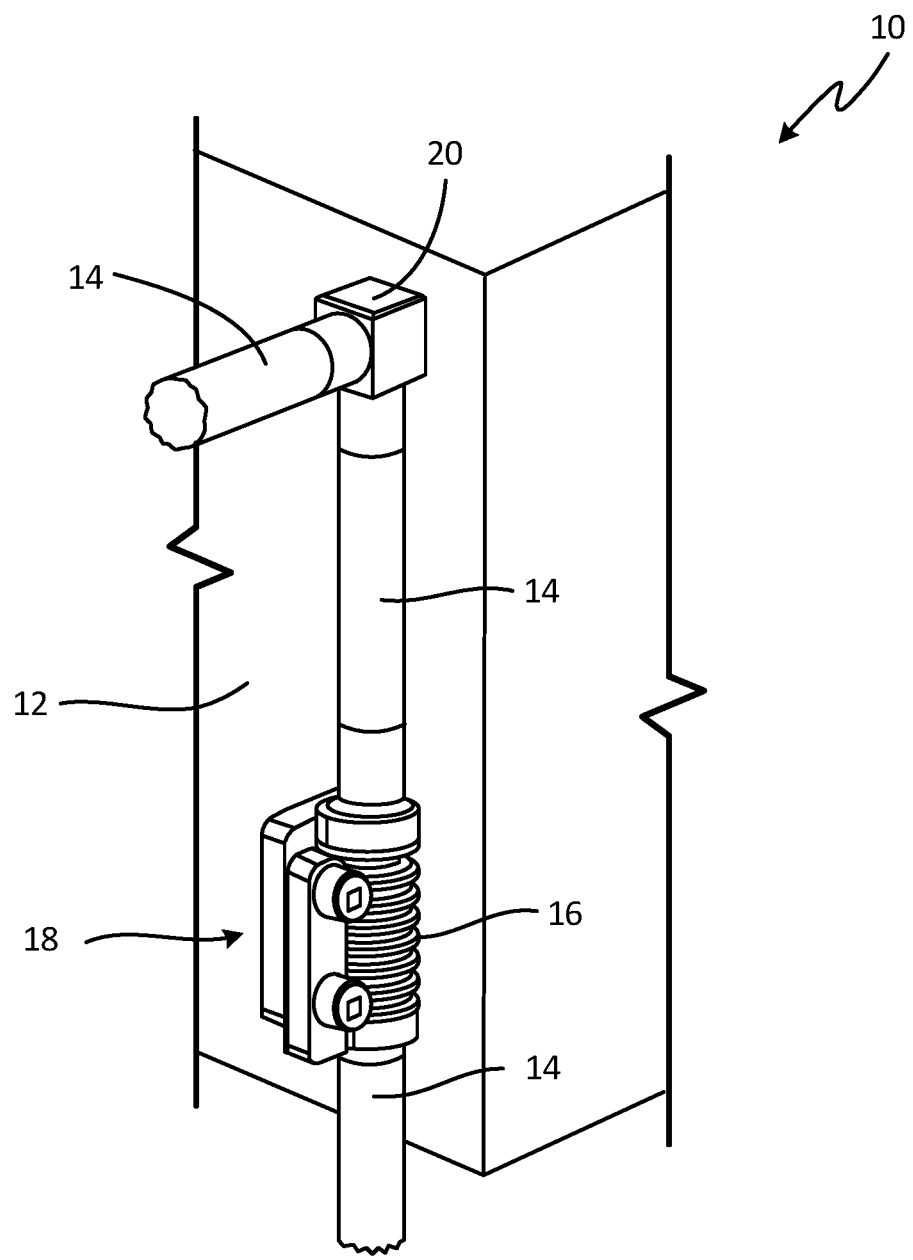
FIG. 1 is a perspective view of a portion of a hydraulic system.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A bellows restraint for use with a bellows is disclosed herein that includes a male bracket and a female bracket that extend towards each other from opposite ends of the bellows to limit extension, compression, and angular deflection of the bellows. The bellows can be along a tube or another fluid line that conveys fluid, such as in a hydraulic system. The male bracket has a mount attached to the tube near the bellows and an arm extending adjacent to the bellows. The female bracket also has a mount attached to the tube on the other end of the bellows and an arm extending adjacent to the bellows so as to also be adjacent to the arm of the male bracket. The bellows restraint includes at least one standoff extending through a corresponding through-hole in the arm of the female bracket to connect to the arm of the male bracket at a corresponding connection point. The standoff and through-hole are sized to allow a specific amount of extension, compression, and angular deflection of the bellows before the standoff contacts the arm of the female bracket (the side of the through-hole) to prevent further movement of the bellows.

The disclosed bellows restraint has many benefits. The bellows restraint can be used even if the bellows and tube are coated with an anticorrosion coating. With the use of coatings, the bellows can only extend, compress, and deflect a certain amount before the coating cracks, so the bellows restraint prevents damage to the coatings by limiting the movement of the bellows. The bellows restraint increases the lifetime of the bellows by preventing damage inflicted on the bellows from over-extending, over-compressing, and over-deflecting. The bellow restraint can be configured to restrain the bellows a specific amount. For example, one bellows restraint can be designed to allow five percent movement in all directions while another bellows restraint can be designed to allow ten percent angular deflection and seven percent extension and compression. The bellows restraint is simple, requiring only two attachment points (at the mount of the male bracket and the mount of the female bracket) and a limited number of components. As discussed above, the bellows restraint is easily adjustable to provide more or less restraint by swapping out the standoff with another standoff that has a larger or smaller diameter, has a noncircular cross section; such as an oval, rectangle, triangle, or another shape; or has a longer or shorter length. Additionally, the female bracket could be swapped with another female bracket that has an arm with a different sized through-hole to allow more or less movement of the standoff within the through-hole. Another benefit is that the bellows restraint is smaller in size than the prior art bellows restraints, which have a cylindrical tube that surround the bellows with rods that run parallel to the bellows on each side to prevent the bellows from extensive movement, whereas the disclosed bellows restraint has an arm of the male bracket and an arm of the female bracket that only extend along one side of the bellows while still restraining the movement of the bellows in all directions. Finally, the bellows restraint can be incorporated into already existing bellows without the need to modify or replace the bellows or other components of the overall system. Each of these benefits, along with others, will be appreciated in the subsequent disclosure.

FIG. 1 is a perspective view of a portion of a hydraulic system. Hydraulic system 10 includes wall 12, tube 14 (also referred to as a fluid line), bellows 16 (also referred to as an expansion joint), bellows restraint 18, and joint 20. Hydraulic system 10 can be located along a flow path connecting two components in any type of system, such as a system in the semiconductor industry. While hydraulic fluid is used to describe the fluid flowing through the flow path, the disclosed bellows 16 and bellows restraint 18 can be used with any fluid, not just hydraulic fluid. Hydraulic fluid enters one end of tube 14, flows through tube 14 (and through bellows 16 and joint 20), and out another end of tube 14. The components of hydraulic system 10 can be constructed from a variety of materials, including stainless steel, a composite material, plastic, combinations thereof, or other materials. Further, hydraulic system 10 can include a number of resilient seals to ensure the flow path is fluidically sealed and hydraulic fluid cannot leak out tube 14 or the components connected by tube 14. The components of hydraulic system 10 can be one continuous and monolithic piece or multiple pieces fastened together. Each component of hydraulic system 10 can be sized to provide sufficient strength and rigidity while also being small enough to aid in the ease of installment of hydraulic system 10 as a whole or each individual component of hydraulic system 10. Additionally, when determining the size, shape, and construction material of hydraulic system 10, thermal expansion and contraction should be taken into consideration because the hydraulic fluid flowing through hydraulic system 10 can be at an elevated or reduced temperature.

Wall 12 of hydraulic system 10 represents a component that is adjacent to tube 14, bellows 16, and bellows restraint 18 that tube 14 can come into contact with if bellows 16 is allows to extend, compress, and/or deflect more than desired. As will be discussed below, bellows restraint 18 can be configured to prevent contact between tube 14 and wall 12 because such contact can cause damage to tube 14. However, bellows restraint 18 can be configured to allow some movement of tube 14 to ensure hydraulic system 10 is not so rigid as to become damaged when any components experience minimal movement.

Tube 14 runs between two components of hydraulic system 10 to form a fluidically sealed flow path for hydraulic fluid. Tube 14 can have a variety of sizes and configurations to effectively and efficiently convey hydraulic fluid through hydraulic system 10, and can be multiple pieces fastened together for ease of construction and installation. Tube 14 can be constructed from a variety of materials, but preferably is constructed from a material resistant to tarnishing and rust, such as stainless steel. Tube 14, along with the other components of hydraulic system 10, can be coated with an anticorrosion coating or another coating. Joint 20 is along tube 14 and is configured to change the direction of tube 14 and/or split the flow path into multiple flow paths. Tube 14 can have multiple joints 20 along the flow path or can be constructed from a material that does not require a separate component to change direction, such as rubber or another resilient material.

Bellows 16 and bellows restraint 18 are along tube 14. Because tube 14 is generally constructed from a rigid material, such as stainless steel, bellows 16 allows tube 14 to extend, compress, and deflect as needed without becoming damaged. Bellows 16 forms a flow path between two portions of tube 14 with the flow path through bellow 16 matching up with the flow path through tube 14. Bellows 16 can be constructed through a variety of methods, such as hydroforming, and can be constructed from a variety of materials. However, bellows 16 should be constructed from a material that is able to extend, compress, and deflect without becoming damaged. Additionally, the inner flow path of tube 14 can be coated with an anticorrosion coating or another coating. Bellows 16 can be sized and shaped to effectively allow hydraulic fluid to flow through the flow path while also allowing tube 14 to extend, compress, and deflect. One of ordinary skill in the art is familiar with the configuration and functionality of bellows 16.

Bellows restraint 18 is adjacent to bellows 16 along tube 14. Bellows restraint 18 restrains bellows 16 to prevent damage to bellows 16 that can occur from over-extending, over-compressing, and over-deflecting or damage to tube 14 that can occur from contact with other components, such as wall 12. Bellows restraint 18 also ensures tube 14 remains in connection with other components because excessive movement of tube 14 could cause tube 14 to disconnect from other components and result in hydraulic fluid leaking out from the flow path. Bellows restraint 18 can be constructed from a variety of materials, such as stainless steel, and should be a material that is rigid and has sufficient strength to prevent excessive movement of bellows 16 without becoming damaged. Bellows 16 and bellows restraint 18 can be located anywhere along tube 14. Depending on design considerations, bellows 16 and bellows restraint 18 can be an entire length of tube 14 or a length that is less than tube 14.

Figure 2A:
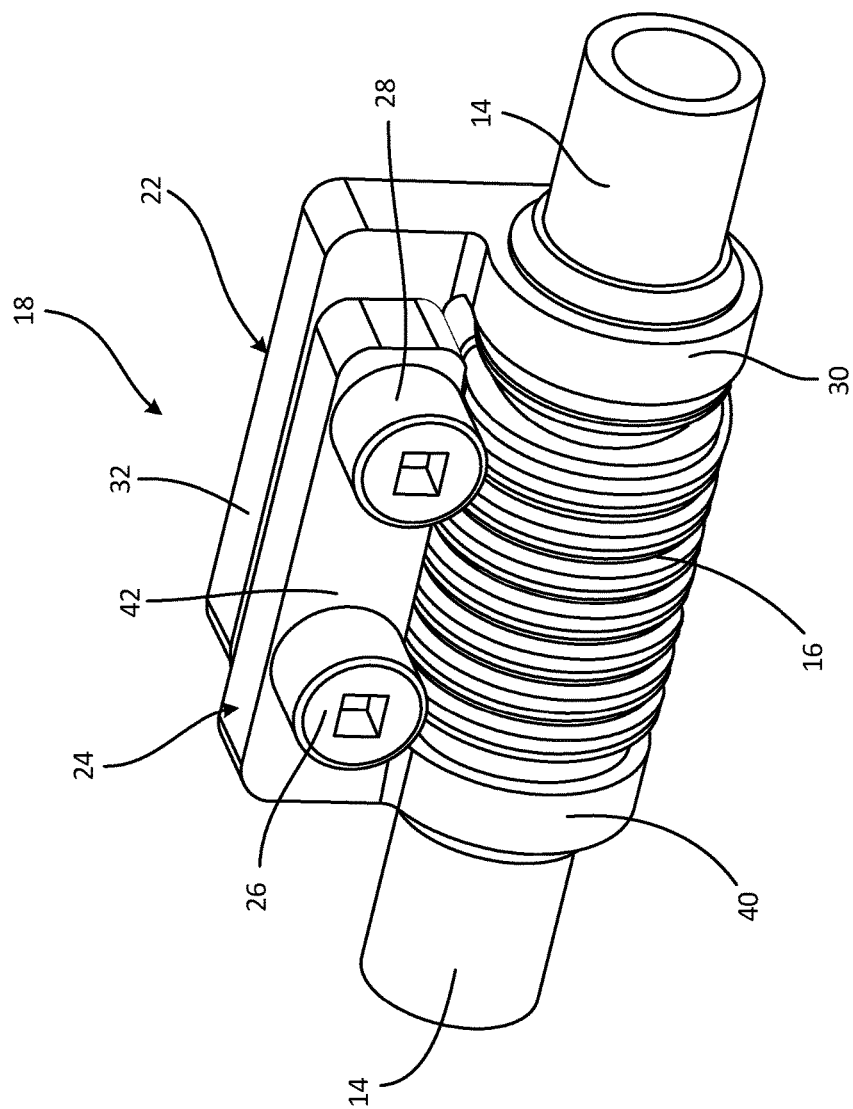
FIG. 2A is a perspective view of a bellows restraint in a free state.
Figure 2B:
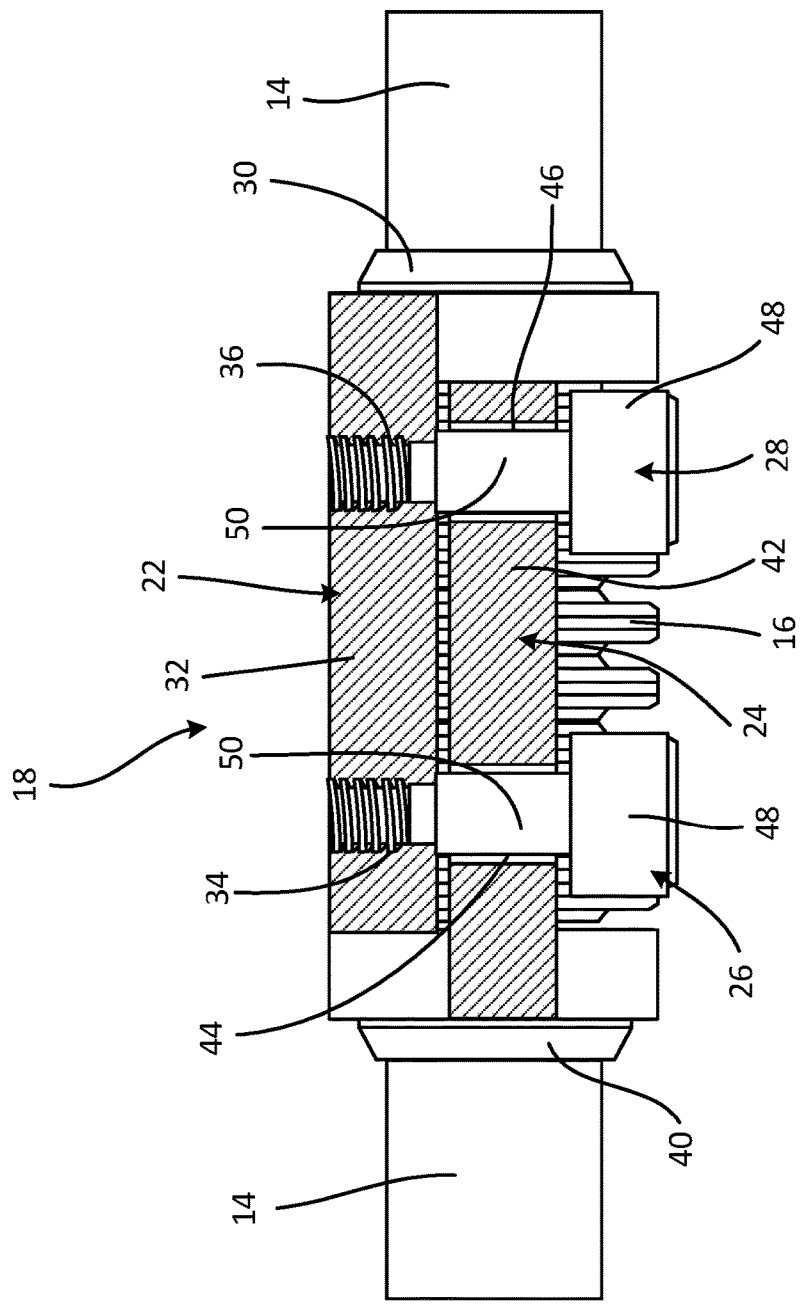
FIG. 2B is a partial cross-section plan view of the bellows restraint in FIG. 2A.
Figure 2C:
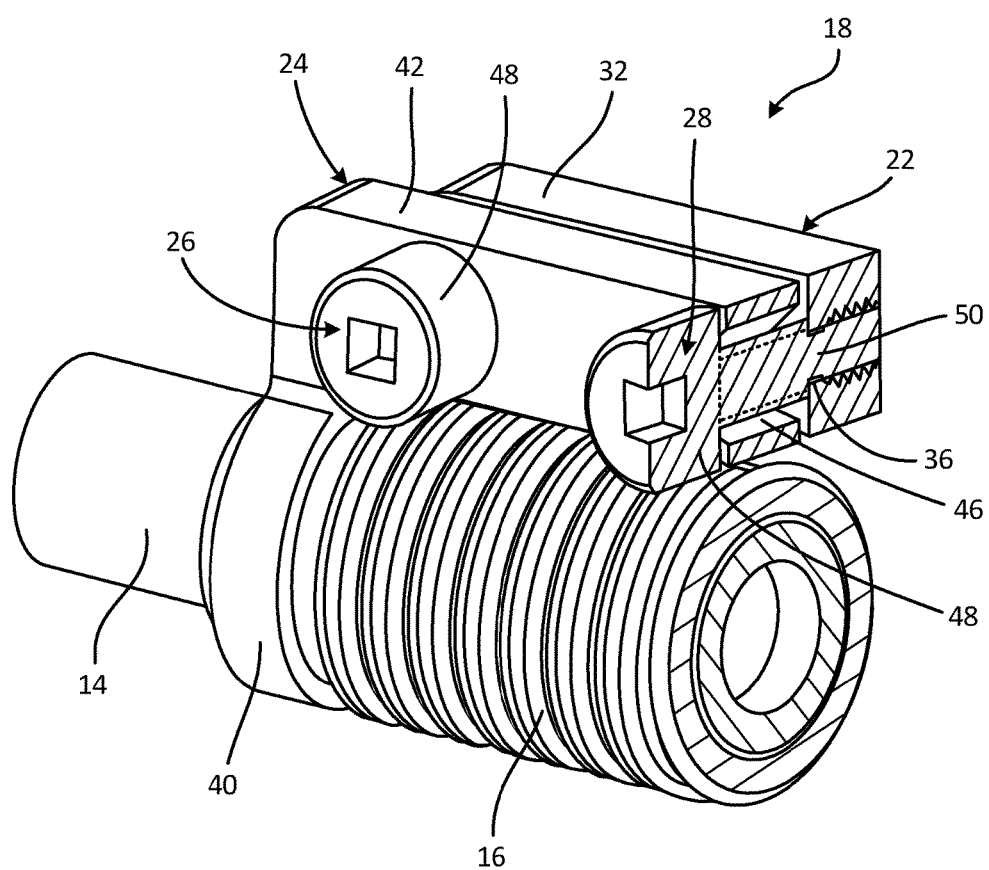
FIG. 2C is a partial cross-section perspective view of the bellows restraint in FIG. 2A.

FIG. 2A is a perspective view of a bellows restraint in a free state (non-extended, non-compressed, and non-deflected state), FIG. 2B is a partial cross-section plan view of the bellows restraint in FIG. 2A, and FIG. 2C is a partial cross-section perspective view of the bellows restraint in FIG. 2A. FIGS. 2A, 2B, and 2C show a portion of tube 14 with bellows 16 and bellows restraint 18 along tube 14.

Bellows restraint 18 includes male bracket 22 (also referred to as a first bracket or first support), female bracket 24 (also referred to as a second bracket or second support), first standoff 26 (also referred to as a first fastener), and second standoff 28 (also referred to as a second fastener). Male bracket 22 includes male mount 30 (also referred to as a first mount or a first bellows attachment) and male arm 32 (also referred to as a first arm or a first extension) with male arm 32 having first connector 34 (also referred to as a threaded portion or hole) and second connector 36 (also referred to as a threaded portion or hole). Female bracket 24 includes female mount 40 (also referred to as a second mount or a second bellows attachment) and female arm 42 (also referred to as a second arm or a second extension) with female arm 42 having first through-hole 44 (also referred to as a first aperture) and second through-hole 46 (also referred to as a second aperture).

Figure 4:
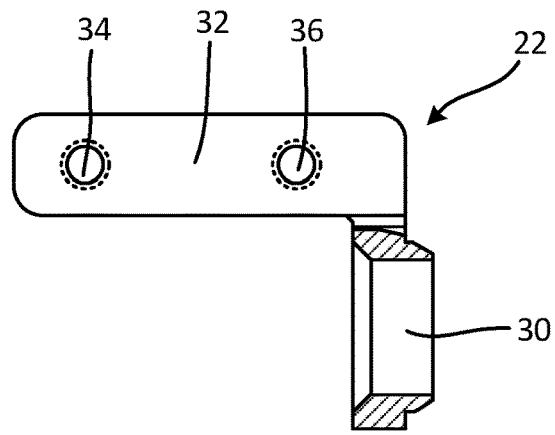
FIG. 4 is a cross-section elevation view of a male bracket of the bellows restraint.

Male bracket 22, which is shown in a cross-section elevation view in FIG. 4, is connected by male mount 30 to tube 14 near an end of bellows 16. Male arm 32 is radially outward from male mount 30 and extends adjacent to and radially outward from bellows 16. Male bracket 22 can be constructed from a variety of materials, such as stainless steel, and should be a material or materials that is rigid and has sufficient strength to prevent excessive movement of bellows 16 without becoming damaged and failing. The components of male bracket 22 can be one continuous and monolithic piece, or male mount 30 and male arm 32 can be separate components fastened to one another.

Male mount 30 is an annular-shaped member that surrounds tube 14 adjacent an end of bellows 16. Male mount 30 is fastened to tube 14 and can be fastened through a variety of means, including screws, bolts, threads on the inside of male mount 30 and the outside of tube 14, welding, brazing, glue, or other means. The attachment of male mount 30 to tube 14 can be permanent or removable to allow male mount 30 to be swapped out with another male mount that has a different configuration as shown in FIG. 9. The connection between male mount 30 and tube 14 can be configured to prevent male mount 30 from rotating freely around tube 14 or can be configured to allow male mount 30 to rotate around tube 14. Male mount 30 can also be one continuous and monolithic piece with tube 14. Additionally, male mount 30 can have a different size, shape, and configuration than the disclosed embodiments to connect male bracket 22 to tube 14 and prevent male bracket 22 from movement relative to an end of tube 14 adjacent bellows 16 and male mount 30.

Male arm 32 is an extension that at one end is connected to and radially outward from male mount 30 and at another end extends adjacent to and radially outward from bellows 16. Male arm 32 can be connected to male mount 30 to extend perpendicular to a tangent line along male mount 30 (as female arm 42 is shown in FIGS. 2A, 2B, and 2C) or can be radially offset so as to be adjacent to female arm 42 (as shown in FIGS. 2A, 2B, and 2C). Male arm 32 can have a rectangular cross-sectional shape, as shown, or can have another cross-sectional shape depending on design considerations, including the amount of strength needed and the space available for male arm 32. Male arm 32 can be fastened to male mount 30 through a variety of means, or male arm 32 can be one continuous and monolithic piece with male mount 30. The connection of male mount 30 to male arm 32 should have sufficient rigidity and strength to prevent excessive extension, compression, and angular deflection of bellows 16 without being damaged or failing. Male arm 32 is distant enough radially from bellows 16 such that male arm 32 is spaced far enough away from bellows 16 to prevent male arm 32 from contacting bellows 16 when bellows 16 is extended, compressed, or deflected. Male arm 32 can extend an entire length of bellows 16 or can extend a length that is less than the entire length of bellows 16. However, male arm 32 should be long enough to provide sufficient area to connect to first standoff 26 and second standoff 28.

First connector 34 and second connector 36 are shown as threaded holes that are spaced apart from one another along male arm 32 and that extend entirely through a width of male arm 32. First connector 34 and second connector 36 allow for attachment of first standoff 26 and second standoff 28, respectively, to male arm 32. First connector 34 and second connector 36 can be any type of connection that secures first standoff 26 and second standoff 28 to male arm 32, but a connection that allows for first standoff 26 and second standoff 28 to be easily removed from male arm 32 may be advantageous to allow for first standoff 26 and second standoff 28 to be switched out for standoffs that are of a different size or configuration. First connector 34 and second connector 36 should be located along male arm 32 at locations that correspond to first through-hole 44 and second through-hole 46 through which first standoff 26 and second standoff 28 extend, respectively.

Figure 5:
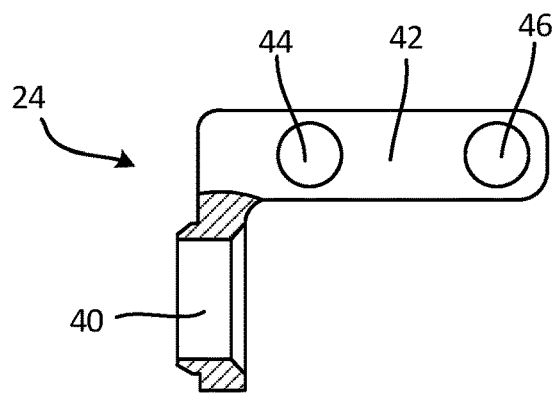
FIG. 5 is a cross-section elevation view of a female bracket of the bellows restraint.

Female bracket 24, which is shown in a cross-section elevation view in FIG. 5, is connected to tube 14 near an end of bellows 16 opposite male bracket 22. Female bracket 24 is connected to tube 14 by female mount 40. Female arm 42 is radially outward from female mount 30 and extends adjacent to and radially outward from bellows 16 and adjacent to male arm 32. Female bracket 24 is similar to male bracket 22 in most aspects, including the materials used to construct female bracket 24, the number of pieces forming female bracket 24 (i.e., whether female bracket 24 is one continuous and monolithic piece or a number of pieces fastened together), and the means used to connect female mount 40 to tube 14.

However, female bracket 24 is different from male bracket 22 in a number of ways. Female bracket 24 connects to tube 14 at an opposite end from bellows 16 than male bracket 22. Also, female arm 42 is adjacent to male arm 32 along bellows 16, so female arm 42 is radially offset from female mount 40 when male arm 32 is not offset from male mount 30 (as shown in FIGS. 2A, 2B, and 2C). In a different embodiment, female arm 42 extends perpendicular to a tangent line along female mount 40 when male arm 32 is radially offset from male mount 30 (i.e., male arm 32 would be positioned where female arm 42 is in FIGS. 2A, 2B, and 2C and vice-versa). Male arm 32 and female arm 42 should be configured adjacent to one another but not in contact so as to create a gap between one another (shown in FIG. 2B) to allow for angular deflection of bellows 16 in all directions, as will be described in greater detail with regards to FIG. 3D.

Female arm 42 includes first through-hole 44 and second through-hole 46 extending through female arm 42, and each is located at a position along a length of female arm 42 that correspond to first connector 34 and second connector 36, respectively. First through-hole 44 and second through-hole 46 allow for first standoff 26 and second standoff 28 to extend through female arm 42 to connect to male arm 32 at first connector 34 and second connector 36, respectively. While the disclosed embodiments show first through-hole 44 and second through-hole 46 extending through female arm 42 perpendicular to a side surface of female arm 42, first through-hole 44 and second through-hole 46 can extend through female arm 42 at a different angle. Additionally, first through-hole 44 and second through-hole 46 can have a variety of sizes, shapes, and configurations depending on a desired amount of extension, compression, and angular deflection of bellows 16.

Figure 6:
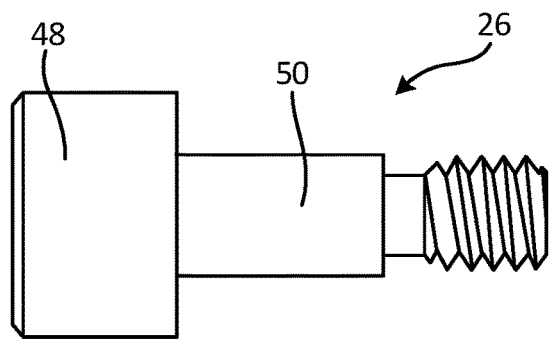
FIG. 6 is a perspective elevation view of a standoff of the bellows restraint.

First standoff 26 and second standoff 28, of which one is shown in a perspective elevation view in FIG. 6, have head 48 and shaft 50. First standoff 26 extends through first through-hole 44 and second standoff 28 extends second through-hole 46 to connect to male arm 32 at first connector 34 and second connector 36, respectively.

Head 48 has a larger cross-sectional area than shaft 50 and the corresponding through-hole, and is not located within the corresponding through-hole as shown in FIGS. 2A, 2B, and 2C. Head 48 prevents the corresponding standoff from being pulled through the through-hole, thereby ensuring male arm 32 is not separated from female arm 42. Additionally, head 48 can include an indentation to allow a tool, such as a screwdriver, to more easily remove standoff 26 and second standoff 28 from male arm 32. Head 48 may also aid in restraining bellows 16 from over-deflection by providing a hard stop when head 48 of either first standoff 26 or second standoff 28 contacts the side surface of female arm 42 (as will be described in greater detail with regards to FIG. 3D).

Shaft 50 has a smaller cross-sectional area that both head 48 and the corresponding through-hole. Shaft 50 can be connected to male arm 32 through a variety of fasteners, but the disclosed embodiments show a threaded connection between shaft 50 of first standoff 26 and first connector 34 and shaft 50 of second standoff 28 and second connector 36. A length and cross-sectional area of shaft 50 should be sized to allow male arm 32 to move relative to female arm 42 to allow bellows 16 to extend, compress, and deflect a designed amount.

Shaft 50 of each of first standoff 26 and second standoff 28 can have a circular cross section or another cross section; such as an oval, rectangle, or triangle; to allow a specific amount of movement of male arm 32 relative to female arm 42. Shaft 50 of each of first standoff 26 and second standoff 28 also may have a varied cross section along the length of shaft 50 to allow differing amounts of movement of bellows 16 depending on the contact between first through-hole 44 and shaft 50 of first standoff 26 and second through-hole 46 and shaft 50 of second standoff 28. Additionally, first through-hole 44 and second-through-hole 46 can have a circular cross section or another cross section to function along with shaft 50 of each of first standoff 26 and second standoff 28 to allow a different desired amount of movement of bellows 16 as compared to through-holes that have a different cross section. Shaft 50 of each of first standoff 26 and second standoff 28 should have a length that is greater than a width of female arm 42 to allow male arm 32 to be able to move in relation to female arm 42 to allow bellows 16 to deflect in all directions. The location of first connector 34, second connector 36, first standoff 26, second standoff 28, first through-hole 44, and second through-hole 46 along the length and width of male arm 32 and female arm 44 can be adjusted to allow more or less angular deflection of bellows 16.

While the disclosed embodiment includes two standoffs 26 and 28, two connectors 34 and 36, and two through-holes 44 and 46, other embodiments can include only one of each or more than two of each. The components of bellows restraint 18; including male arm 32, female arm 42, first standoff 26, second standoff 28, first through-hole 44, and second through-hole 46; all work together to restrain the amount of extension, compression, and angular deflection of bellows 16 while also being configured in relation to one another to allow a specific limited amount of extension, compression, and angular deflection of bellows 16. First standoff 26, second standoff, 28, first connector 34, and second connector 36 can be configured to allow for easy removal of first standoff 26 and second standoff 28 and replacement with differently sized and shaped standoffs to allow for more or less extension, compression, or angular deflection of bellows 16. Bellows restraint 18 limits the extension, compression, and angular deflection of bellows 16 with a configuration that is simple, adjustable, and requires a limited amount of components.

Figure 3A:
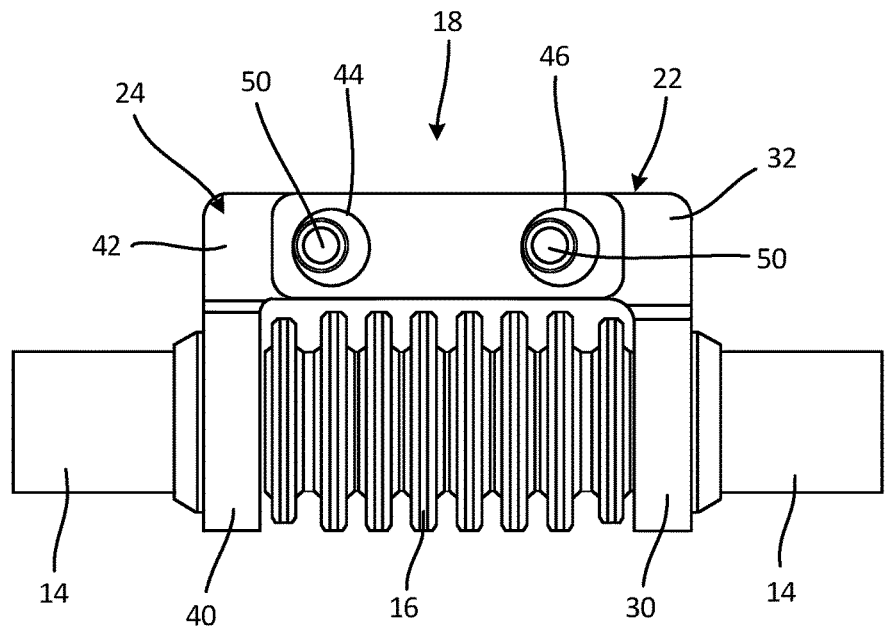
FIG. 3A is a side elevation view of the bellows restraint in an extended state.
Figure 3B:
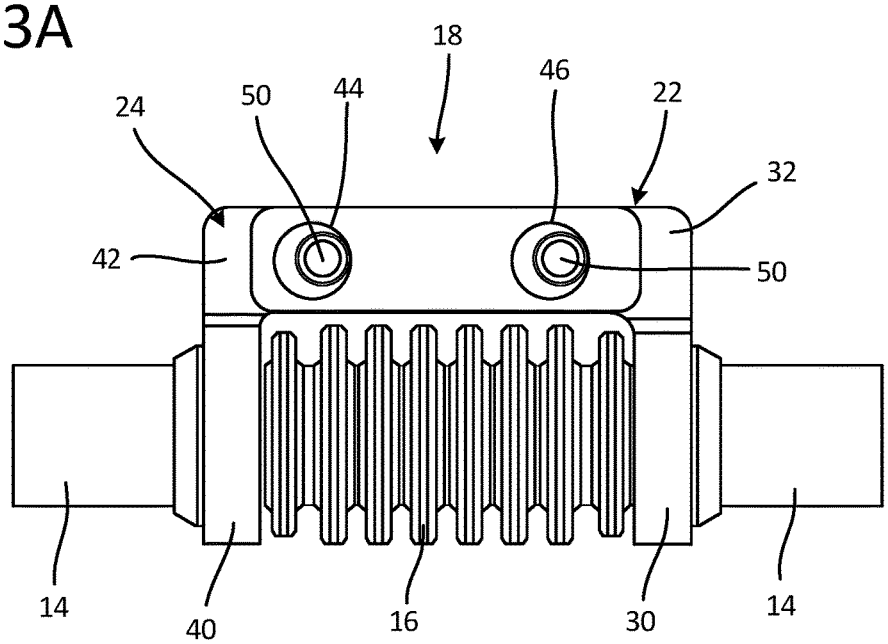
FIG. 3B is a side elevation view of the bellows restraint in a compressed state.
Figure 3C:
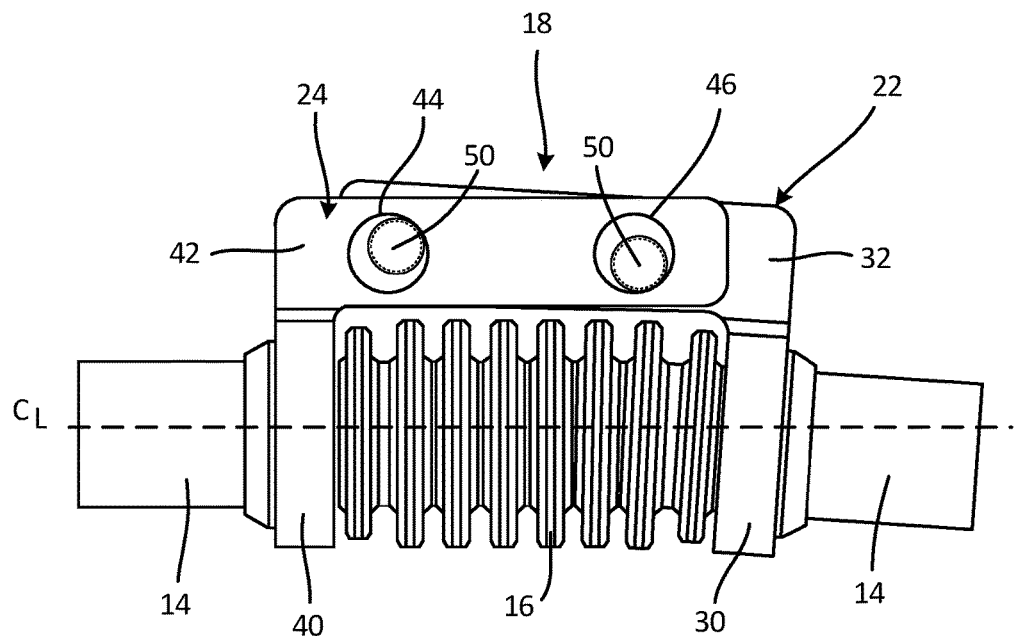
FIG. 3C is a side elevation view of the bellows restraint in a first deflected state.
Figure 3D:
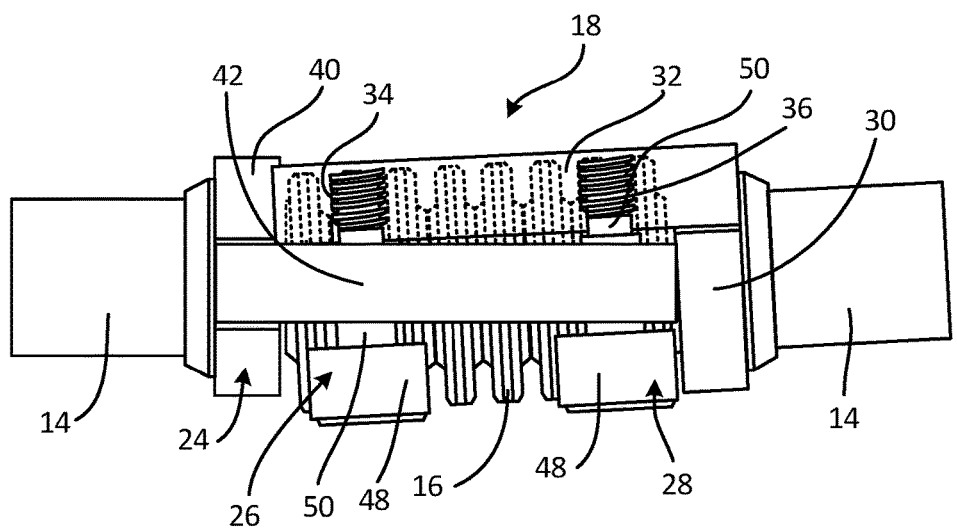
FIG. 3D is a partial cross-section plan view of the bellows restraint in a second deflected state.

FIG. 3A is a side elevation view of bellows restraint 18 in an extended state, FIG. 3B is a side elevation view of the bellows restraint 18 in a compressed state, FIG. 3C is a side elevation view of the bellows restraint 18 in a first deflected state, and FIG. 3D is a partial cross-section plan view of the bellows restraint 18 in a second deflected state. FIGS. 3A, 3B, 3C, and 3D show a portion of tube 14 with bellows 16 and bellows restraint 18 along tube 14. Bellows restraint 18 includes male bracket 22, female bracket 24, first standoff 26 (with head 48 and shaft 50), second standoff 28 (with head 48 and shaft 50), male mount 30, male arm 32 (with first connector 34 and second connector 36), female mount 40, and female arm 42 (with first through-hole 44 and second through-hole 46). FIGS. 3A, 3B, 3C, and 3D show how bellows restraint 18 allows for a specific amount of extension, compression, and angular deflection of bellows 16 but prevents over-extension, over-compression, and over-deflection through the design of the components of bellows restraint 18 and how those components interact with one another.

In FIG. 3A, bellows 16 is in an extended state to a point where bellows restraint 18 is preventing any further extension. In the extended state, bellows 16 has a length that is longer than a length of bellows 16 in the free state. The extension of bellows 16 is allowed because, when in the free state, shaft 50 of each of first standoff 26 and second standoff 28 are not in contact with any sides of first through-hole 44 and second through-hole 46, respectively. Therefore, bellows 16 is allowed to extend an amount until shaft 50 contacts the side of first-through hole 44 and second through-hole 46. The amount bellows 16 is able to extend is the same as a distance between shaft 50 of first standoff 26 and the side of first-through hole 44 when bellows restraint 18 is in the free state (and a distance between shaft 50 of the second standoff 28 and the side of second through-hole 46 when bellows restraint 18 is in the free state). If more extension or less extension is desired for bellows 16, the cross sections of first through-hole 44 and second through-hole 46 can be adjusted, such as making the cross sections to be larger or smaller circles or reshaping the cross sections to be ovals or rectangles. Additionally, the cross section of first-through hole 44 could be a different size or shape than the cross section of second through-hole 46. Another way to increase or decrease the amount bellows 16 is allowed to extend is by resizing or reshaping the cross-sectional area of shaft 50 of each of first standoff 26 and second standoff 28. Also, the placement of first through-hole 44 and second through-hole 46 along female arm 42 in relation to first standoff 26 and second standoff 28 can be adjusted to allow more or less extension.

In FIG. 3B, bellows 16 is in a compressed state to a point where bellows restraint 18 is preventing any further compression. In the compressed state, bellows 16 has a length that is shorter than a length of bellows 16 in the free state. The compression of bellows 16 is allowed because, when in the free state, shaft 50 of each of first standoff 26 and second standoff 28 are not in contact with any side of first through-hole 44 and second through-hole 46, respectively. Therefore, bellows 16 is allowed to compress an amount until shaft 50 contacts the side of first-through hole 44 and second through-hole 46. The amount bellows 16 is able to compress is the same as a distance between shaft 50 of first standoff 26 and the side of first-through hole 44 when bellows restraint 18 is in the free state (and a distance between shaft 50 of the second standoff 28 and the side of second through-hole 46 when bellows restraint 18 is in the free state). If more or less compression is desired for bellows 16, the cross sections of first through-hole 44 and second through-hole 46 can be adjusted, such as making the cross sections to be larger or smaller circles or reshaping the cross sections to be ovals or rectangles. Additionally, the cross section of first-through hole 44 could be a different size or shape than the cross section of second through-hole 46. Another way to increase or decrease the amount bellows 16 is allowed to compress is by resizing or reshaping the cross-sectional area of shaft 50 of each of first standoff 26 and second standoff 28. Also, the placement of first through-hole 44 and second through-hole 46 along female arm 42 in relation to first standoff 26 and second standoff 28 can be adjusted to allow more or less compression.

In FIG. 3C, bellows 16 is in a first deflected state (deflecting downward in FIG. 3C) to a point where bellows restraint 18 is preventing any further angular deflection. In this deflected state or when bellows 16 is deflecting in a plane parallel to male arm 32 and female arm 42 (i.e., deflecting upward in FIG. 3C), shaft 50 of each of first standoff 26 and second standoff 28 contact near either the top or bottom of first through-hole 44 and second through-hole 46, respectively. The angular deflection of bellows 16 in the plane parallel to male arm 32 and female arm 42 is allowed because, when in the free state, shaft 50 of each of first standoff 26 and second standoff 28 are not in contact with any side of first through-hole 44 and second through-hole 46, respectively. Therefore, bellows 16 is allowed to deflect an amount until shaft 50 contacts the side of first-through hole 44 and second through-hole 46. If more or less deflection in the plane parallel to male arm 32 and female arm 42 is desired for bellows 16, the cross sections of first through-hole 44 and second through-hole 46 can be adjusted, such as making the cross sections to be larger or smaller circles or reshaping the cross sections to be ovals or rectangles. Additionally, the cross section of first-through hole 44 could be a different size or shape than the cross section of second through-hole 46. Another way to increase or decrease the amount bellows 16 is allowed to deflect in the plane parallel to male arm 32 and female arm 42 is by resizing or reshaping the cross-sectional area of shaft 50 of each of first standoff 26 and second standoff 28 (as will be described with regards to FIGS. 7 and 8).

In FIG. 3D, bellows 16 is in a second deflected state (deflecting downward in FIG. 3D) to a point where bellows restraint 18 is preventing any further angular deflection. In this deflected state or when bellows 16 is deflecting in a plane perpendicular to male arm 32 and female arm 42 (i.e., deflecting upward in FIG. 3D), shaft 50 of each of first standoff 26 and second standoff 28 contact an edge of each side of first through-hole 44 and second through-hole 46, respectively, an end of male arm 32 contacts an end of female arm 42 near female mount 40, and head 48 of second standoff 28 contacts a side surface of female arm 42. For a deflection of bellows 16 in an opposite direction (i.e., downward in FIG. 3D), shaft 50 of each of first standoff 26 and second standoff 28 contact an opposite edge of each side of first through-hole 44 and second through-hole 46, respectively, an end of female arm 42 contacts an end of male arm 32 near male mount 24, and head 48 of first standoff 26 contacts a side surface of female arm 42. The angular deflection of bellows 16 in the plane perpendicular to male arm 32 and female arm 42 is allowed because, when in the free state, shaft 50 of each of first standoff 26 and second standoff 28 are not in contact with any side of first-through hole 44 and second-through hole 46, a gap is present between male arm 32 and female arm 42, and head 48 of each of first standoff 26 and second standoff 28 is spaced away from the surface of female arm 42 (as shown in FIG. 2B). Therefore, bellows 16 is allowed to deflect an amount until first standoff 26 and second standoff 28 contact female arm 42 and/or male arm 32 contacts female arm 42. If more or less deflection in the plane perpendicular to male arm 32 and female arm 42 is desired for bellows 16, many dimensions can be altered. The cross sections of first through-hole 44 and second through-hole 46 can be adjusted, such as making the cross sections to be larger or smaller circles or reshaping the cross sections to be ovals or rectangles. The cross section of first-through hole 44 could be a different size or shape than the cross section of second through-hole 46. Another way to increase or decrease the amount bellows 16 is allowed to deflect is by resizing or reshaping the cross-sectional area of shaft 50 of each of first standoff 26 and second standoff 28 or by increasing or decreasing a thickness of female arm 42. Also, increasing or decreasing the length of shaft 50 could increase or decrease the gap between male arm 32 and female arm 42 or could increase or decrease the space between female arm 42 and head 48 of each of first standoff 26 and second standoff 28 to allow for more or less deflection. Finally, the placement of male arm 32 and/or female arm 42 in relation to male mount 30 and female mount 40 and in relation to one another can adjust the gap between male arm 32 and female arm 42 to allow more or less deflection.

For a deflection of bellows 16 that is not in the plane parallel or perpendicular to male arm 32 and female arm 42, the contact between the components of bellows restraint 18 will be a combination of those described with regards to FIGS. 3C and 3D and the adjustments made to increase or decrease the deflection of bellows 16 in those directions would be a combination of those adjustments described with regards to FIGS. 3C and 3D.

Figure 7:
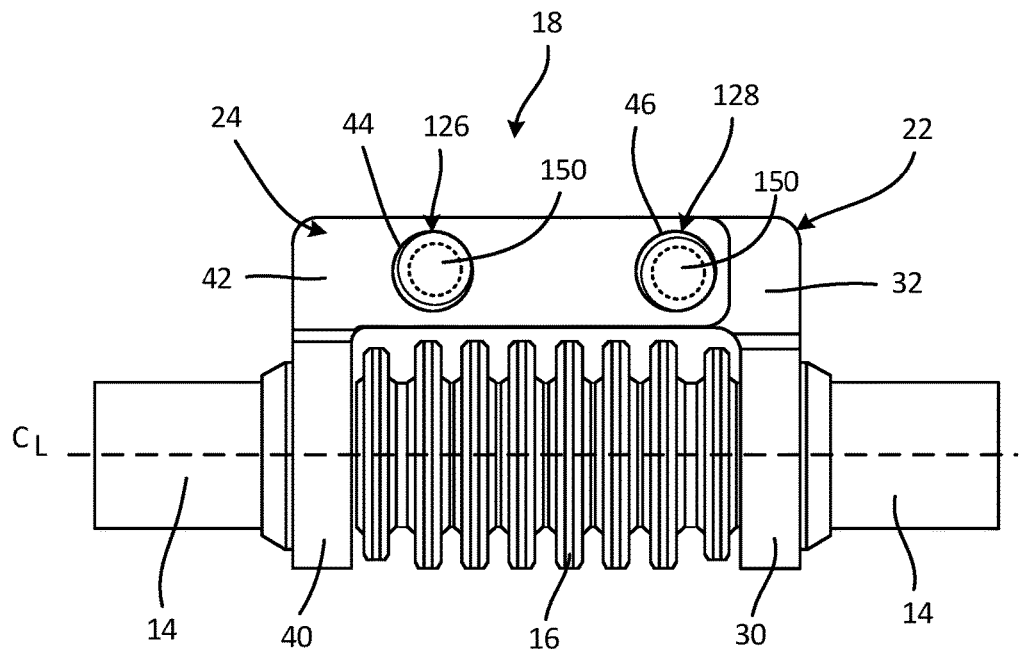
FIG. 7 is a side elevation view of another embodiment of standoffs utilized with bellows restraint in a first deflected state.
Figure 8:
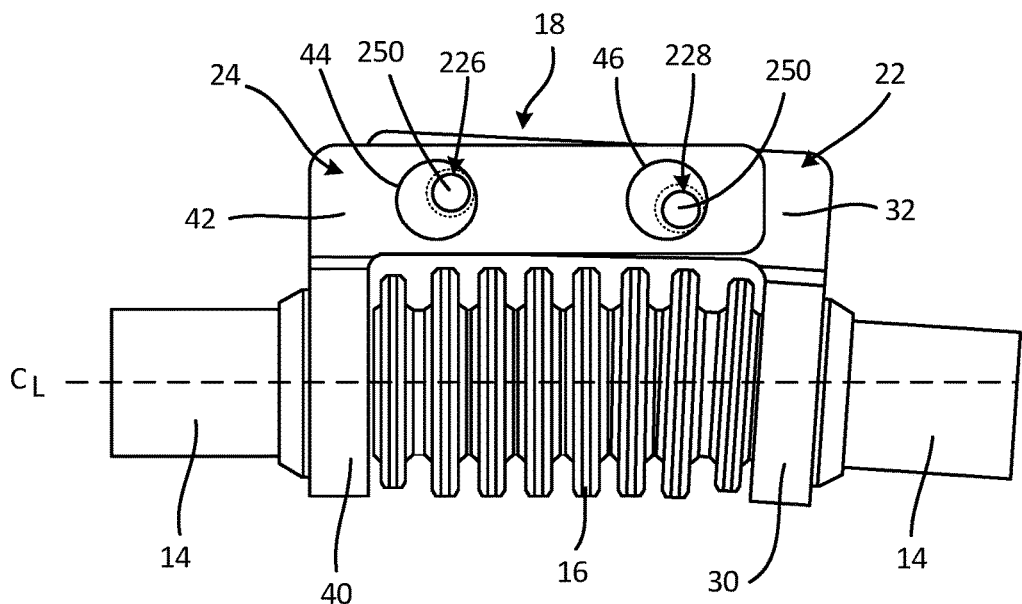
FIG. 8 is a side elevation view of a third embodiment of standoffs utilized with the bellows restraint in a first deflected state.

FIG. 7 is a side elevation view of another embodiment of standoffs utilized with bellows restraint 18 in a first deflected state. Bellows restraint 18 in FIG. 7 is the same as bellows restraint 18 of previous figures except that shaft 150 of each of first standoff 126 and second standoff 128 has a larger cross-sectional area (i.e., a larger diameter) than the cross-sectional area of shaft 50 of each of first standoff 26 and second standoff 28. Because shaft 150 has a larger cross-sectional area, less space is present between shaft 150 and the sides of first through-hole 44 and second through-hole 46, respectively, when bellows restraint 18 is in the free state. Therefore, bellows 16 is allowed only to deflect a small amount until shaft 150 contacts the side of first through-hole 44 and second through-hole 46, respectively. The difference in an amount of deflection allowed by each of the embodiments in FIGS. 2C, 7, and 8 is shown be comparing the amount of deflection to centerline CL. First standoff 126 and second standoff 128 having shaft 150 with a larger diameter also allows less deflection in other directions (i.e., into and out of the page) than a shaft with a smaller diameter.

FIG. 8 is a side elevation view of a third embodiment of standoffs utilized with bellows restraint 18 in a first deflected state. Bellows restraint 18 in FIG. 8 is the same as bellows restraint 18 in the previous figures, including FIG. 7, except that shaft 250 of each of first standoff 226 and second standoff 228 has a smaller cross-sectional area (i.e., a smaller diameter) than the cross-sectional area of shaft 50 of each of first standoff 26 and second standoff 28. Because shaft 250 has a smaller cross-sectional area, more space is present between shaft 250 and the sides of first through-hole 44 and second through-hole 46, respectively, when bellows restraint 18 is in the free state. Therefore, bellows 16 is allowed to deflect a greater amount until shaft 250 contacts the side of first through-hole 44 and second through-hole 46, respectively. First standoff 226 and second standoff 228 having shaft 250 with a smaller diameter also allows more deflection in other directions (i.e., into and out of the page) than a shaft with a larger diameter.

The different embodiments of the standoffs of bellows restraint 18 can be interchangeable such that an amount of deflection can be adjusted by replacing each respective standoff with another standoff having a larger or smaller cross-sectional area, such as first standoff 126 and second standoff 128 shown in FIG. 7 or first standoff 226 and second standoff 228 shown in FIG. 8. Because first standoffs 26, 126, and 226 and second standoffs 28, 128, and 228 can be attached to male arm 32 through the use of a threaded connection, replacement of the standoff is quick and easy. Thus, the amount of extension, compression, and angular deflection of bellows 16 can be adjusted depending on design considerations and changes to hydraulic system 10 even after bellows restraint 18 is in place adjacent to bellows 16.

FIG. 9 is a perspective view of a fourth embodiment of bellows restraint 318 in a free state. Hydraulic system 10 in FIG. 9 is the same as hydraulic system 10 from the previous figures except for bellows restraint 318 (as opposed to bellows restraint 18 from previous figures). FIG. 9 shows a portion of tube 14 and bellows 16. Bellows restraint 318 includes male bracket 322, female bracket 324, first standoff 326, and second standoff 328. Male bracket 322 includes male mount 330, which has upper male mount 330*a* and lower male mount 330*b*, and male arm 332, which has first connector 334 and second connector 336. Female bracket 324 includes female mount 340, which has upper female mount 340*a* and lower female mount 340*b*, and female arm 342, which has first through-hole 344 and second through-hole 346.

The components of bellows restraint 318 are similar to those of bellows restraint 18 except that male mount 330 and female mount 340 are each separated into an upper mount (upper male mount 330*a* and upper female mount 340*a*) and a lower mount (lower male mount 330*b* and lower mount 340*b*). The separation of the mounts into multiple pieces allows each of the mounts to be installed and removed from surrounding tube 14 after hydraulic system 10 is already assembled without the need to disassemble tube 14 and bellows 16. Upper male mount 330*a* and upper female mount 340*a* can be fastened to lower male mount 330*b* and lower female mount 340*b*, respectively, through a variety of means, including rivets, clamps, a threaded connection with bolts 352 as shown in FIG. 9, or other means. Upper male mount 330*a* and lower male mount 330*b* can be configured to surround tube 14 tightly so as to not allow male mount 330 (and male bracket 322) to rotate about tube 14 or can be configured such that male mount 330 is allowed to rotate with respect to tube 14. Similarly, upper female mount 340*a* and lower female mount 340*b* can be configured to surround tube 14 tightly so as to not allow female mount 340 (and female bracket 324) to rotate about tube 14 or can be configured such that female mount 340 is allowed to rotate with respect to tube 14. However, the configuration of male mount 330 and female mount 340 should allow for each to be easily installed and removed without causing damage to tube 14 and bellows 16 and without the need to disassemble hydraulic system 10. While upper male mount 330*a*, upper female mount 340*a*, lower male mount 330*b*, and lower female mount 340*b* are shown as having flanges to accommodate fasteners 454, other configurations that allow for each upper mount to be connected to the respective lower mount can be utilized.

Bellows restraint 18 and 318 for use with bellows 16 is disclosed herein that includes male bracket 22 and female bracket 24 that extend towards each other from opposite ends of bellows 16 to limit extension, compression, and angular deflection of bellows 16. Bellows 16 can be along tube 14 that conveys fluid, such as in hydraulic system 10. Male bracket 22 has male mount 30 attached to tube 14 near bellows 16 and male arm 32 extending adjacent to and radially outward from bellows 16. Female bracket 24 has female mount 40 attached to tube 14 on the other end of bellows 16 and female arm 42 extending adjacent to and radially outward from bellows 16 so as to also be adjacent to male arm 32. Bellows restraint 18 includes at least one standoff (first standoff 26 and second standoff 28) extending through a corresponding through-hole (first through-hole 44 and second through-hole 46) in female arm 42 to connect to male arm 32 at a corresponding connection point (first connector 34 and second connector 36). The standoffs and through-holes are sized to allow a specific amount of extension, compression, and angular deflection of bellows 16 before the standoff contacts female arm 42 (the sides of first through-hole 44 and second through-hole 46) to prevent further movement of bellows 16.

The disclosed bellows restraint 18 and 318 has many benefits. Bellows restraint 18 and 318 can be used even if bellows 16 and tube 14 have are coated with anticorrosion coating. With the use of coatings, bellows 16 can only extend, compress, and deflect a certain amount before the coating cracks, so bellows restraint 18 and 318 prevents damage to the coatings. Bellows restraint 18 and 318 increases the lifetime of bellows 16 by preventing damage inflicted on bellows 16 from over-extending, over-compressing, and over-deflecting. Bellow restraint 18 and 318 can be configured to restrain bellows 16 a specific amount. For example, one bellows restraint 18 can be designed to allow five percent movement in all directions while another bellows restraint 18 can be designed to allow ten percent angular deflection and seven percent extension and compression. Bellows restraint 18 and 318 is simple, requiring only two attachment points (at male mount 30 and female mount 40) and a limited number of separate components. As discussed above, bellows restraint 18 and 318 is easily adjustable to provide more or less restraint by swapping out first standoff 26 and/or second standoff 28 with another standoff that has a larger or smaller diameter; such as first standoff 126 or 226 and second standoff 126 or 226; has a noncircular cross section; such as an oval, rectangle, triangle, or another shape; or has a longer or shorter length. Additionally, female bracket 24 could be swapped with another female bracket 24 that has female arm 40 with a different sized first through-hole 44 and/or second through-hole 46 to allow more or less movement of first standoff 26 within first through-hole 44 and second standoff 28 within second through-hole 46. Another benefit is that bellows restraint 18 is smaller in size than the prior art bellows restraints, which have a cylindrical tube that surround the bellows with rods that run parallel to the bellows on each side to prevent the bellows from extensive movement, whereas bellows restraint 18 has male arm 32 and female arm 42 that only extend along one side of bellows 16 while still restraining the movement of bellows 16 in all directions. Bellows restraint 18 and 318 can be incorporated into already existing bellows 16 without the need to modify or replace bellows 16. Finally, bellows restraint 318 can be configured to allow installation and removal without the need for disassembling tube 14 and bellows 16 of hydraulic system 10.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bellows restraint comprising:
    a first bracket having a first mount and a first arm extending from the first mount;
    a second bracket having a second mount and a second arm extending from the second mount to be adjacent to the first arm, the second arm having a first through-hole and a second through-hole;
    a first fastener extending through the first through-hole of the second arm to connect to the first arm, the first fastener having a cross-sectional area that is smaller than a cross-sectional area of the first through-hole to allow the first bracket to move in relation to the second bracket; and
    a second fastener extending through the second through-hole of the second arm to connect to the first arm, the second fastener having a cross-sectional area that is smaller than the cross-sectional area of the second through-hole to allow the first bracket to move in relation to the second bracket.

2. The bellows restraint of claim 1, wherein the cross-sectional area of the first through-hole is circular and the cross-sectional area of the first fastener is circular.

3. The bellows restraint of claim 1, wherein the cross-sectional area of the first fastener is oval.

4. The bellows restraint of claim 1, wherein a gap is present between the first arm and the second arm.

5. The bellows restraint of claim 1, wherein the first fastener has a threaded portion that corresponds to a threaded portion in the first arm to attach the first fastener to the first arm.

6. The bellows restraint of claim 1, wherein the first fastener has a head that prevents the first fastener from being pulled through the at least one through-hole.

7. An assembly comprising:
    a tube with a hollow inner flow path configured to allow a fluid to flow through the tube;
    an expansion joint along the tube; and
    a restraint comprising:
        a first bracket having a first mount attached to the tube and a first arm extending adjacent to the expansion joint;
        a second bracket having a second mount attached to the tube and a second arm extending adjacent to the expansion joint and the first arm, the second arm having a first through-hole and a second through-hole;
        a first standoff extending through the first through-hole of the second arm and fastened to the first arm to limit extension, compression, and an angular deflection of the expansion joint; and
        a second standoff extending through the second through-hole of the second arm and fastened to the first arm.

8. The assembly of claim 7, wherein the hollow inner flow path is coated with an anticorrosion coating.

9. The assembly of claim 7, wherein the first mount is annular shaped and encircles the tube at a first point adjacent one end of the expansion joint and the second mount is annular shaped and encircles the tube at a second point adjacent the other end of the expansion joint.

10. The assembly of claim 7, wherein the first arm is substantially rectangular with a length that is similar to a length of the expansion joint and the second arm is substantially rectangular with a length that is similar to the length of the expansion joint.

11. The assembly of claim 7, wherein the first standoff has a cross-sectional area that is less than a cross-sectional area of the first through-hole and the second standoff has a cross-sectional area that is less than a cross-sectional area of the second through-hole.

12. The assembly of claim 7, wherein the first standoff includes a first head and the second standoff includes a second head to prevent the first bracket from being separated from the second bracket.

13. The assembly of claim 7, wherein the first standoff has a circular cross section and the second standoff has a circular cross section.

14. The assembly of claim 7, wherein the first standoff has an oval cross section and the second standoff has an oval cross section.

15. The assembly of claim 7, wherein the first bracket and the second bracket are configured so that a gap is present between the first arm and the second arm when the expansion joint is in a free state.

16. The assembly of claim 7, wherein the first arm includes at least one threaded hole to accommodate a threaded portion of the first standoff with the first standoff being removable from the at least one threaded hole.

17. The assembly of claim 7, wherein the tube conveys hydraulic fluid.

18. A connection along a hydraulic fluid flow path comprising:
  a fluid line;
  a bellows along the fluid line configured to allow compression, extension, and angular deflection of the fluid line; and
  a bellows restraint adjacent to the bellows configured to limit an amount of compression, extension, and angular deflection of the fluid line, the bellows restraint comprising:
    a first support having a first bellows attachment to connect the first support to a first end of the bellows and a first extension extending along the fluid line adjacent to the bellows;
    a second support having a second bellows attachment, a second extension, a first aperture, and a second aperture with the second bellows attachment connecting the second support to a second side of the bellows and the second extension extending along the fluid line adjacent to the bellows and adjacent to the first extension;
    a first standoff having a first shaft and a first head, the first shaft extending through the first aperture in the second extension and connected to the first extension with the first shaft having a cross-sectional area that is less than a cross-sectional area of the first aperture; and
    a second standoff having a second shaft and a second head, the second shaft extending through the second aperture in the second extension and connected to the first extension with the first shaft having a cross-sectional area that is less than a cross-sectional area of the second aperture.

* * * * *